United States Patent
Odonnell-Dunn

(10) Patent No.: US 9,800,534 B2
(45) Date of Patent: Oct. 24, 2017

(54) COMMUNICATION OF MEDIA ASSETS FROM SOCIAL PUBLICATION SERVICES

(71) Applicant: Thomson Licensing, Issy les Moulineaux (FR)

(72) Inventor: Laura Odonnell-Dunn, Hermosa Beach, CA (US)

(73) Assignee: Thomson Licensing (FR)

( * ) Notice: Subject to any disclaimer, the term of this patent is extended or adjusted under 35 U.S.C. 154(b) by 276 days.

(21) Appl. No.: 14/367,176

(22) PCT Filed: Jan. 4, 2013

(86) PCT No.: PCT/US2013/020259
§ 371 (c)(1),
(2) Date: Jun. 19, 2014

(87) PCT Pub. No.: WO2013/103797
PCT Pub. Date: Jul. 11, 2013

(65) Prior Publication Data
US 2015/0019660 A1    Jan. 15, 2015

Related U.S. Application Data

(60) Provisional application No. 61/584,144, filed on Jan. 6, 2012.

(51) Int. Cl.
*G06F 15/16* (2006.01)
*H04L 12/58* (2006.01)
(Continued)

(52) U.S. Cl.
CPC ............ *H04L 51/32* (2013.01); *G06F 3/0481* (2013.01); *G06F 17/30029* (2013.01);
(Continued)

(58) Field of Classification Search
CPC combination set(s) only.
See application file for complete search history.

(56) References Cited

U.S. PATENT DOCUMENTS

2008/0040673 A1* 2/2008 Zuckerberg ....... G06F 17/30867
715/745
2008/0065604 A1* 3/2008 Tiu ..................... G06F 17/30569
(Continued)

FOREIGN PATENT DOCUMENTS

| CN | 101561820 | 10/2009 |
|---|---|---|
| CN | 101878482 | 11/2010 |

(Continued)

OTHER PUBLICATIONS

PCT International Search Report for PCT/US2013/020259 (8pages).

*Primary Examiner* — Zarni Maung
(74) *Attorney, Agent, or Firm* — Jack Schwartz & Associates, PLLC

(57) ABSTRACT

The present disclosure is directed towards having media assets that come from different social publication services be communicated to a user based on different conditions. Specifically, a determination is made from metadata associated with a media asset whether the media asset is of a particular type (315), is published from a specified party (320), and whether the media asset comes from an approved social publication service (310). If the determination is affirmative (325), the media asset is communicated to a user, otherwise the communication is prevented (325).

8 Claims, 4 Drawing Sheets

(51) Int. Cl.
*G06F 17/30* (2006.01)
*G06Q 50/00* (2012.01)
*G06Q 10/10* (2012.01)
*G06F 3/0481* (2013.01)
*G06F 15/00* (2006.01)

(52) U.S. Cl.
CPC ..... *G06F 17/30867* (2013.01); *G06Q 10/107* (2013.01); *G06Q 50/01* (2013.01)

(56) References Cited

U.S. PATENT DOCUMENTS

| | | |
|---|---|---|
| 2009/0144780 A1 | 6/2009 | Toebes et al. |
| 2009/0265426 A1 | 10/2009 | Svendsen et al. |
| 2009/0307345 A1* | 12/2009 | Carter ............... G06Q 30/02 709/224 |
| 2010/0293105 A1* | 11/2010 | Blinn ................. G06Q 10/10 705/319 |
| 2010/0293560 A1* | 11/2010 | Bland ................. H04L 12/585 719/328 |
| 2011/0004831 A1* | 1/2011 | Steinberg ........... H04N 21/454 715/753 |
| 2011/0021250 A1* | 1/2011 | Ickman ............ G06F 17/30867 455/566 |
| 2011/0137894 A1* | 6/2011 | Narayanan ........ G06F 17/3089 707/723 |
| 2011/0238754 A1* | 9/2011 | Dasilva ............. G06F 17/3082 709/204 |
| 2011/0320538 A1* | 12/2011 | Ickman ................. G06F 9/542 709/206 |

FOREIGN PATENT DOCUMENTS

| | | |
|---|---|---|
| JP | 2007251674 | 9/2007 |
| WO | 2011022206 | 2/2011 |

* cited by examiner

US 9,800,534 B2

COMMUNICATION OF MEDIA ASSETS FROM SOCIAL PUBLICATION SERVICES

CROSS REFERENCE TO RELATED APPLICATIONS

This application claims the benefit, under 35 U.S.C. §365 of International Application PCT/US2013/020259, filed Jan. 4, 2013, which was published in accordance with PCT Article 21(2) on Jul. 11, 2013 in English and which claims the benefit of U.S. provisional patent application No. 61/584,144, filed Jan. 6, 2012.

FIELD OF THE INVENTION

The present disclosure generally to social publication services, and more specifically to a determining whether a media asset that is published on a social publication service is communicated to a user.

BACKGROUND OF THE INVENTION

When a person uses a social networking service and receives different communications from their friends to whom they are connected on such service, it is possible that the person receives the media assets such as photos, messages, videos, and audio recordings from their friends. It is possible however that the person receives too many media assets from their friends, or alternatively a user may not want to receive certain media assets from their friends through the social networking service. A more problematic situation arises when a person is connected to their friends through multiple social network services, photo sharing services, messaging services, and the like where a person can receive multiple copies of a media asset from their friends from each of these services known as social publication services.

SUMMARY OF THE INVENTION

A method and apparatus are directed towards determining a whether a media asset that is sent to a user through a social publishing service should be communicated to a user. Such a determination is made relative to user preferences concerning whether a media asset is from a specified party, of a particular type, and from a particular social publishing service. If the media asset does not meet such criteria about, the communication of the media asset is prevented.

DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DESCRIPTION OF THE PREFERRED EMBODIMENTS

Figure 1:
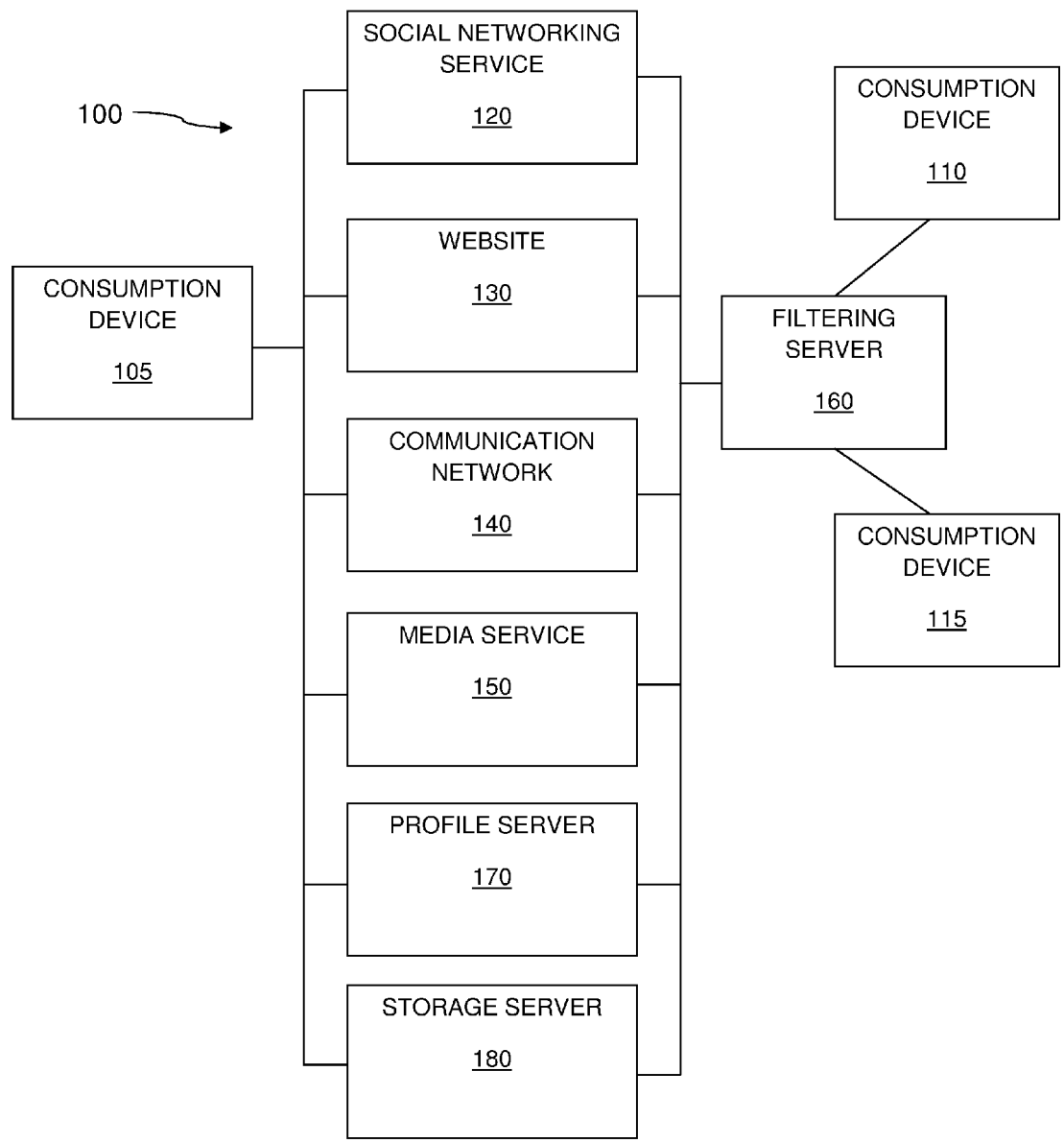
FIG. 1 is a block diagram of an exemplary system communicating media assets in accordance with an embodiment of the present disclosure.

For purposes of this specification, the term social publishing service is an internet based service where a user posts different types of media assets such as videos, audio, pictures, electronic messages, links to websites, a message text, and the like to the publishing service. These media assets are then provided to a user who is accessing the social publishing. Some social publishing services support the publishing of multiple types of media assets as well. External users can access these published media assets through a program such as a web browser, a client application written specifically for a social publishing service which access such a social publishing service directly. Examples of existing social publishing services include FACEBOOK, TWITTER, FLICKR, PINTREST, INSTAGRAM, TUMBLR, YOUTUBE, and the like.

Social publishing services can also receive media assets from other social publishing services. For example, a user can publish their photos from a first social publishing service to a second publishing service. The same user can also publish other types of media assets from other publishing services to the second publishing service. In addition, some publishing services are capable of having media assets reposted from other users. For example, a first user can publish a media asset received from a second user through a social publishing service where such an operation is called a reposting operation.

Media assets from a social publishing service can also be forwarded to a user where such media assets can be collected in a storage repository such as a digital locker implemented as a server.

The term specified party relates to a person or service that a user permissively agrees to receive media assets from. In one example, a user accepts an invitation from a specified party on a social networking service such as FACEBOOK where the social networking service will make available through a posting operation, forwarding operation, communicating operation, providing operation, and the like, media assets from the specified party to the user. Conversely, a user sends an invitation to the specified party on a social networking service, where the media assets published by the specified party will be forwarded to the user when the specified party accepts the invitation. In a second example, a user indicates through a social publishing service such as TWITTER that the user wants to follow the posts from a specified party. Other connections between a user and a specified party can be created in accordance with the disclosed principles.

Users can be known as being linked or connected when a first user and a second user are "FRIENDS" of each other through a social networking service, where the first and second users are listed on the same list of a third user, a first and second user are grouped together in the same category either implicitly or explicitly with each other's permission, a first and second user are grouped together in the same category either implicitly or explicitly by a third party, and the like.

FIG. 1 is an exemplary embodiment of a system 100 in accordance with the present disclosure. Consumption device 105 represents a device such as a computer, set top box, tablet, television, phone, personal access device, gateway, and the like that is used to communicate an electronic communication to other devices such as consumption device 110 or consumption device 115.

The publishing of media assets between users operating consumption devices 105, 110, and 115 can take place through various social publishing services such as social network service 120. Examples of social networking services include, but are not limited to, FACEBOOK, GOOGLE+, MYSPACE, LINKEDIN, PINTREST, INSTAGRAM, TUMBLR and the like. The communication of media assets via social publishing services between users can also take place via a website 130 and/or a communication network 140 such as, and not limited to, a telephone connection, satellite, connection, cellular network, WI-FI Digital Subscriber Line (DSL), Internet communication, and the like. Media service provider 150 include, but are not limited to, NETFLIX, M-GO, AMAZON CLOUD SERVICE, ITUNES, PANDORA, FLICKR and the like can also be used to communicate media assets between users who use devices such as consumption devices 105, 110, and 115.

Filtering server 160 can filter the delivery of media assets between consumption devices 105, 110, and 120. That is, media assets are communicated from a social publishing service are first communicated to filter server 160 in order to determine if such media assets should be made available to different consumption devices. Filter server 160 can be set up to determine if the media asset is of a particular type, comes from a specified social publishing service, is published by a specified party using such a social publishing service, and to whom the media asset is being communicated to. Such information can come from the social publishing services themselves, a profile server 170 that contains profile information of different users, from users themselves, and the like. Filter server 160 based on the determinations listed above can communicate media assets to a user, prevent the communication of media assets to a user, forward media assets to a user, block the forwarding of media assets to a user, filter media assets, provide media assets, change access privileges to media assets, and the like.

In an optional embodiment, the operation of filtering server 160 can be performed within a social publishing service such a social networking service 120, website 130, communication network 140, media service provider 150, and the like. In another optional embodiment, the operation of filtering server 160 can also be performed within a consumption device 105, 110, 115, and the like.

Profile server 170 contains user profile data that indicates a user's preferences including the type of media assets the user wants to receive, the social publishing services used, the specified parties a user is connected with through such social publishing services, media asset filtering data, and the like. Such data can come from sources such as a consumption device 105, 110, 115, social networking service 120, website 130, communication network 140, media service provider 150, filtering service 160, a user, other social publishing service, and the like. Storage server 180 contains media assets that are communicated from sources such as a consumption device 105, 110, 115, social networking service 120, website 130, communication network 140, media service provider 150, filtering service 160, a user, other social publishing service, and the like. Storage server 180 can operate a storage locker for media assets.

Figure 2:
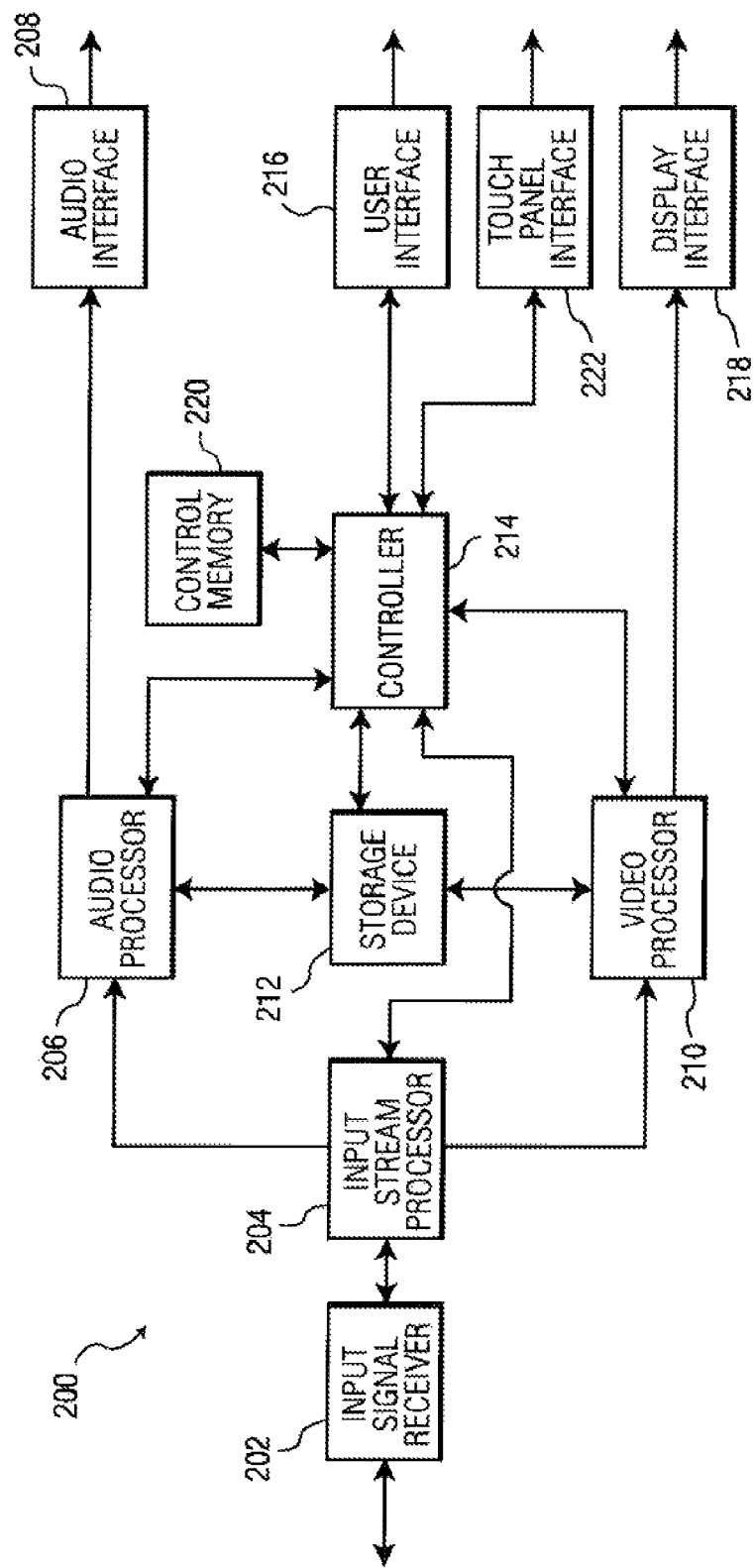
FIG. 2 is a block diagram of an exemplary consumption device in accordance with an embodiment of the present disclosure.

Turning now to FIG. 2, a block diagram of an embodiment of a consumption device 200 is shown. The device 200 shown can be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 can be one of several known receiver circuits used for receiving, demodulation, and decoding signals provided over one of the several possible networks including over the air, cable, satellite, Ethernet, fiber and phone line networks. The desired input signal can be selected and retrieved by the input signal receiver 202 based on user input provided through a control interface or touch panel interface 222. Touch panel interface 222 can include an interface for a touch screen device. Touch panel interface 222 can also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 can provide a digital signal to an audio output device or display device using a High-Definition Multimedia Interface (HDMI) cable or alternate audio interface such as via a Sony/Philips Digital Interconnect Format (SPDIF). The audio interface can also include amplifiers for driving one more sets of speakers. The audio processor 206 also performs any necessary conversion for the storage of the audio signals.

The video output from the input stream processor 204 is provided to a video processor 210. The video signal can be one of several formats. The video processor 210 provides, as necessary, a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 can be a hard disk drive, one or more large capacity integrated electronic memories, such as static RAM (SRAM), or dynamic RAM (DRAM), or can be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 can be an analog signal interface such as red-green-blue (RGB) or can be a digital interface such as HDMI. It is to be appreciated that the display interface 218 will generate the various screens for presenting the search results in a two dimensional form as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 can interface with a search engine for the searching of content and the creation and adjusting of the display of graphical objects representing such content which can be stored or to be delivered via storage server 180, described above.

The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 can store instructions for controller 214. Control memory 220 can also store a database of elements, such as graphic elements containing content, various graphic elements used for generating a displayed user interface for display interface 218, and the like. Alternatively, the memory can store the graphic elements in identified or grouped memory locations and use an access or location table to identify the memory locations for the various portions of information related to the graphic elements. In addition, various graphic elements can be generated in response to computer instructions interpreted by controller 214 for output to display interface 218. Additional details related to the storage of the graphic elements will be described below. Further, the implementation of the control memory 220 can include several possible embodiments, such as a single memory device or, alternatively, more than one memory circuit communicatively connected or coupled together to form a shared or common memory. Still further, the memory can be included with other circuitry, such as portions of bus communications circuitry, in a larger circuit.

Optionally, controller 214 can be adapted to extract metadata from audio and video media by using audio processor 206 and video processor 210, respectively. That is, metadata that is contained in the video signal in the vertical blanking interval, auxiliary data fields associated with video, or in other areas in the video signal can be harvested by using the video processor 210 with controller 214 as to generate metadata that can be used for functions such as generating an electronic program guide, providing descriptive information about received video, supporting an auxiliary information service, and the like. Similarly, the audio processor 206 working with controller 214 can be adapted to recognize audio watermarks that can be in an audio signal. Such audio watermarks can then be used to perform some action such as the recognition of the audio signal identifying the source of an audio signal, or performing some other service. Furthermore, metadata to support the actions listed above can come from a network or other source.

Referring back to FIG. 1, profile server 170 can be implemented to keep track of a user's preferences including the type of media assets the user wants to receive, the social publishing services used, the specified parties a user is connected with through such social publishing services, where an example of such information for a user is shown in TABLE 1 in accordance with the presented principles.

TABLE 1

| SPECIFIED PARTY | SOCIAL PUBLISHING SERVICE | PICTURES | MESSAGES | AUDIO | VIDEO |
|---|---|---|---|---|---|
| Friend A | FACEBOOK | NO | YES | YES | YES |
| Friend A | TWITTER | NO | YES | NO | YES |

TABLE 1-continued

| SPECIFIED PARTY | SOCIAL PUBLISHING SERVICE | PICTURES | MESSAGES | AUDIO | VIDEO |
|---|---|---|---|---|---|
| Friend A | INSTAGRAM | YES | NO | NO | NO |
| Friend B | FACEBOOK | YES | NO | YES | YES |
| Friend B | TWITTER | NO | YES | NO | NO |
| Friend B | INSTAGRAM | NO | NO | NO | NO |
| Friend B | FLICKR | YES | NO | NO | NO |

The column for specified party represents the different people/entities that a user has a permissive relationship with. Social publishing service indicates a particular social publishing service that a user receives communications from in the form of media assets which are published from specified parties. The next four columns represent different types of media assets including pictures, messages, audio, and videos. The Yes or No indicate whether a user is supposed to receive a media asset type from a specified party which is communicated through a social publication service. Information that defines the specified party, media asset, media asset type, source of a published asset, social publishing service, and the like can come from commands that come from a social publishing service, metadata embedded within a media asset, metadata associated with a media asset, a separate stream of metadata, an XML commands, and the like. The described operations of permitting and preventing communications of media assets, as listed for TABLE 1 can be performed by consumption devices 105, 110, 115, social networking service 120, website 130, communications network 140, media service provider 150, filtering server 160, profile server 170, storage server 180, and the like, in accordance with the described principles.

Figure 3:
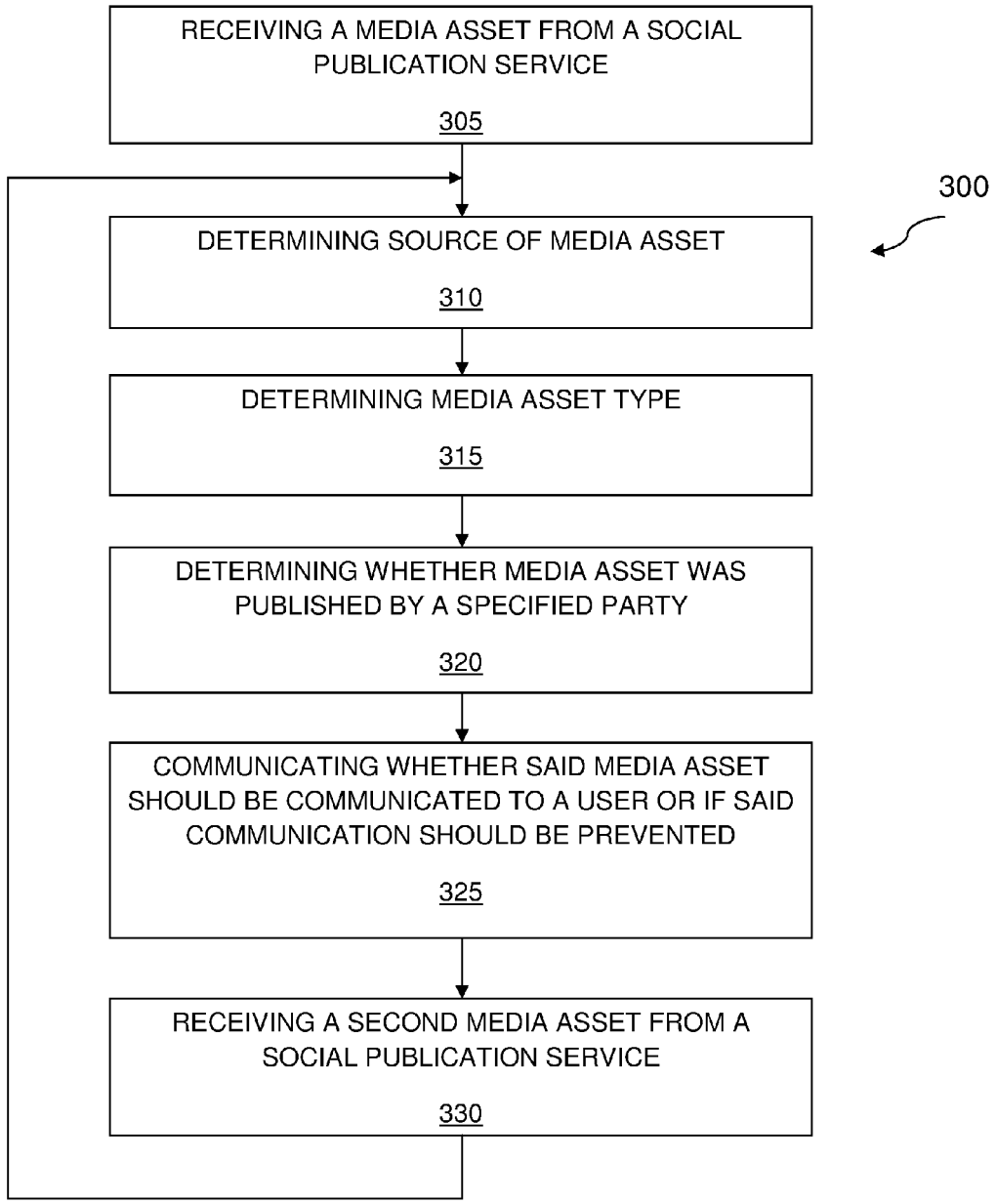
FIG. 3 displays a flow diagram of a method for determining whether a media asset is to be communicated to a user.

FIG. 3 is a flow chart of a method 300 for communicating a media asset received from a social publishing service is shown. The described steps can be implemented using a device 200, consumption devices 105, 110, 115, social networking service 120, website 130, communications network 140, media service provider 150, filtering server 160, profile server 170, storage server 180, and the like.

In step 305, a media asset is received from a social publishing service. The receipt of the media asset can be performed at the point of a social publishing service where a specified party posts or uploads a media asset to the social publishing service. The receipt of a media service can also having the media asset being transmitted from a social publishing service to an intervening device such as filtering server 160, or to directly to consumption devices 105, 110, 115, and the like. Note, the receipt of a media asset is not the same thing as the presentation of a media asset.

The following determination steps 310, 315, and 320 can use data from a user profile server 160 or from another source in accordance with the described principles.

In step 310, a determination is made to determine the source of a media asset. Such a determination can be made from metadata that is included with the media asset, metadata that comes from the source that provide the media asset, a server that provides metadata, from filtering server 160, from profile server 170, or any other method that is capable of being used to communicate metadata in accordance with the described principles. Step 315 has a type of media being determined for a received media asset where such an operation can be performed by analyzing the media asset itself, referencing metadata associated with the media asset, and the like.

In step 320, a determination is made whether the received media asset was published by a specified party. As stated before, a specified party would ideally a party that a user has permissively connected to through a social networking service, other type of service which has users link to each other by accepting invitations to be connected together, and the like. The determination in step 320 can be made from noting the source via commands, metadata associated with the media asset, and the like in accordance with the described principles.

In step 325, the method continues where a determination is made whether a received media asset is of an appropriate type, from an appropriate social publishing service, and published from a appropriate specified party where such a determination is made based on the results of previous steps 305, 315, and 320. If a media asset is of an appropriate type, from an appropriate social publishing service, and from a specified party, the media asset is then communicated to a user in step 325; otherwise the communication of the media asset to a user is prevented in step 325.

The communication of a media asset in step 325 can be one of a presentation of the media asset, a playback of the media asset, a forwarding of the media asset, and the like. The preventing of a communication of the media asset in step 325 can be filtering out the media asset, preventing the display of the media asset, preventing the playback of the media asset, blocking of a transmission of the media asset, and the like.

Step 330 is the receipt of a second media asset where steps 310, 315, 320, and 325 are repeated to determine whether or not the second media asset is to be communicated. Several different scenarios exist for step 330 where the second media asset is of a same or different type from the first media asset, the second media asset is published by a same or different specified party, the second media asset comes from a same or different social publication service, and the like. Depending on the scenario for the second media asset and the respective user profile information, it is possible that a first media asset will be communicated while the communication of a second media asset will be prevented in accordance with the described principles. It is also possible that the first and second media asset can be communicated based on the results of steps 310, 315, 320, and 325, in accordance with the described principles.

Figure 4:
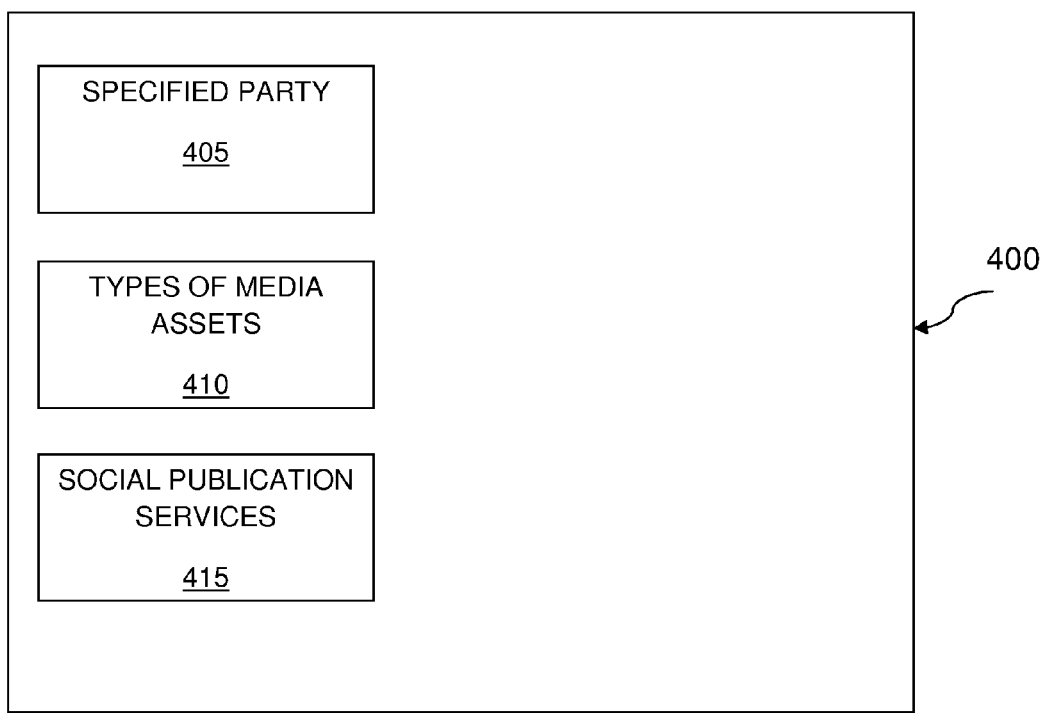
FIG. 4 displays a user interface for generating user preference information in accordance with an embodiment of the present disclosure.

FIG. 4 is a view of an illustrative user interface 400 that is used for creating user profile data in accordance with the presented principles. In displayed element 400, a user can input data identifying the specified parties to whom the user wants to receive media assets. In displayed element 410, a user can enter in data indicating the types of media assets the user wants to receive. In displayed element 415, the user enters in what social publication services the user wants to receive media assets from. Such information, when entered in, can be used to generate similar data as shown in TABLE 1 and can be used for populating profile server 170, in accordance with the described principles.

It should be understood that the elements shown in the figures can be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes that can be substantially represented in computer readable media and so executed by a computer or processor, whether or not such computer or processor is explicitly shown. The computer readable media and code written on can be implemented in a transitory state (signal) and a non-transitory state (e.g., on a tangible medium such as CD-ROM, DVD, Blu-Ray, Hard Drive, flash card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. It is noted that modifications and variations can be made by persons skilled in the art in light of the above teachings.

The invention claimed is:

1. A method in a social networking environment comprising, at a filtering server:

receiving, at an input signal receiver, a media asset of a media asset type from a social publication service over a network connection;

communicating, by a processor, said media asset to a consumption device, in accordance with a profile stored in a profile storage, when said media asset is of an appropriate media asset type and published by a specified party on said social publication service;

receiving, at the input signal receiver, a second media asset of a media asset type from said social publication service over said network connection;

preventing communication, by said processor, of said second media asset to said consumption device, in accordance with said profile stored in said profile storage, when said second media asset is published by a second specified party on said social publication service and said media asset type of said media asset and second media asset are the same; and communicating said second media asset to said consumption device, in accordance with said profile stored in said profile storage, when said second specified party published said second media asset on a second social publication service.

2. The method of claim 1 wherein said social publication service is at least one of: an instant message service, a social networking service, a photo sharing service, a video sharing service, an audio sharing service, and an application service.

3. The method of claim 1, wherein said type of media is at least one of: audio, video, photo, link to a website, and message.

4. The method of claim 1 wherein said specified party and a user of said consumption device are members of said social publication service and said specified party and user have permissively linked to each other.

5. An apparatus in a social networking environment comprising:

an input interface that receives a media asset of a media asset type from a social publication service over a network connection;

a processor that communicates said media asset to a consumption device, in accordance with profile information, when said media asset is of an appropriate media asset type and published by a specified party on said social publication service;

a storage device that stores said profile information;

said input interface receives via said input interface a second media asset of a media asset type from said social publication service over said network connection;

said processor prevents a communication of said second media asset to said consumption device, in accordance with said profile information, when said second media asset is published by a second specified party on said social publication service and said media asset type of said media and second media are the same; and said processor communicates said second media asset to said consumption device, in accordance with said profile information, when said second specified party published said second media asset on a second social publication service.

6. The apparatus of claim 5, wherein said social publication service is at least one of: an instant message service, a social networking service, a photo sharing service, a video sharing service, an audio sharing service, and an application service.

7. The apparatus of claim 5, wherein said type of media is at least one of: audio, video, photo, link to a website, and message.

8. The apparatus of claim 5, wherein said specified party and a user of said consumption device are members of said social publication service and said specified party and user have permissively linked to each other.

* * * * *